May 9, 1933.  J. B. WHITTED  1,908,391
SHOCK ABSORBER
Filed April 3, 1928   2 Sheets-Sheet 1
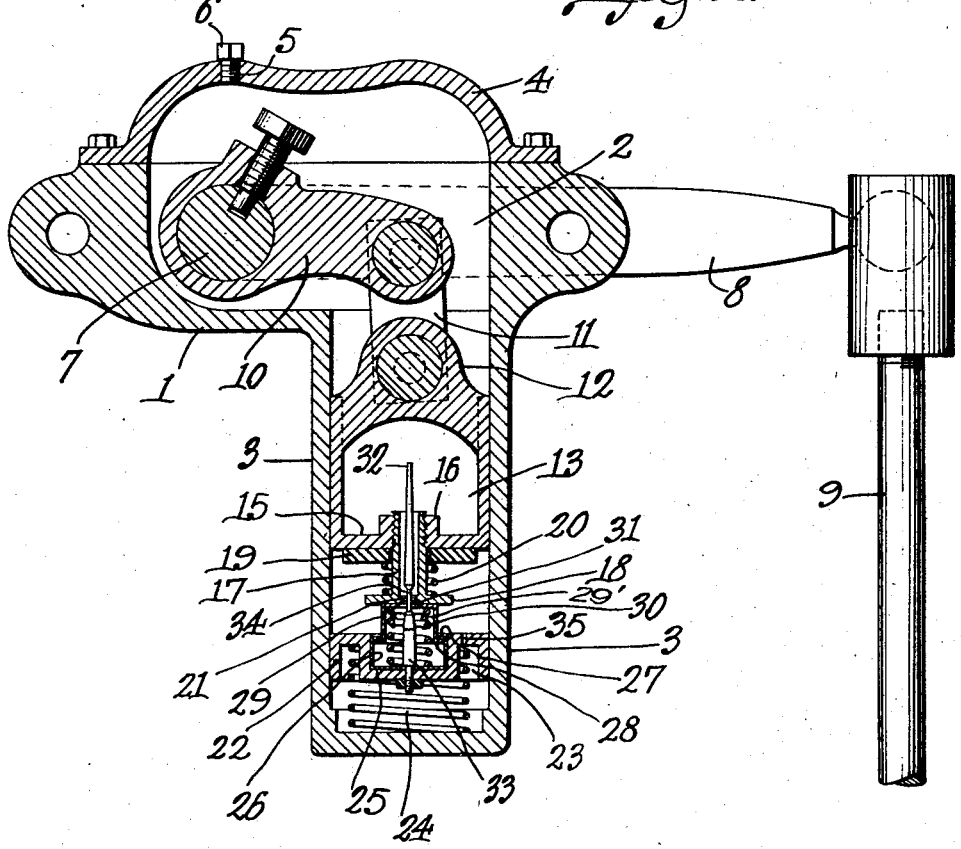
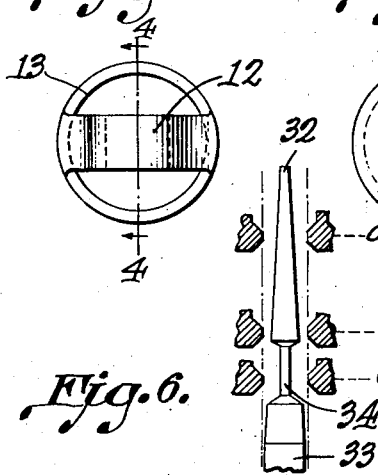
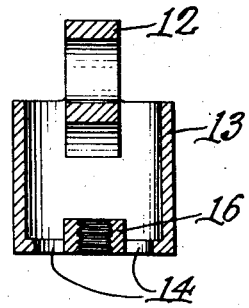
John B. Whitted
Inventor

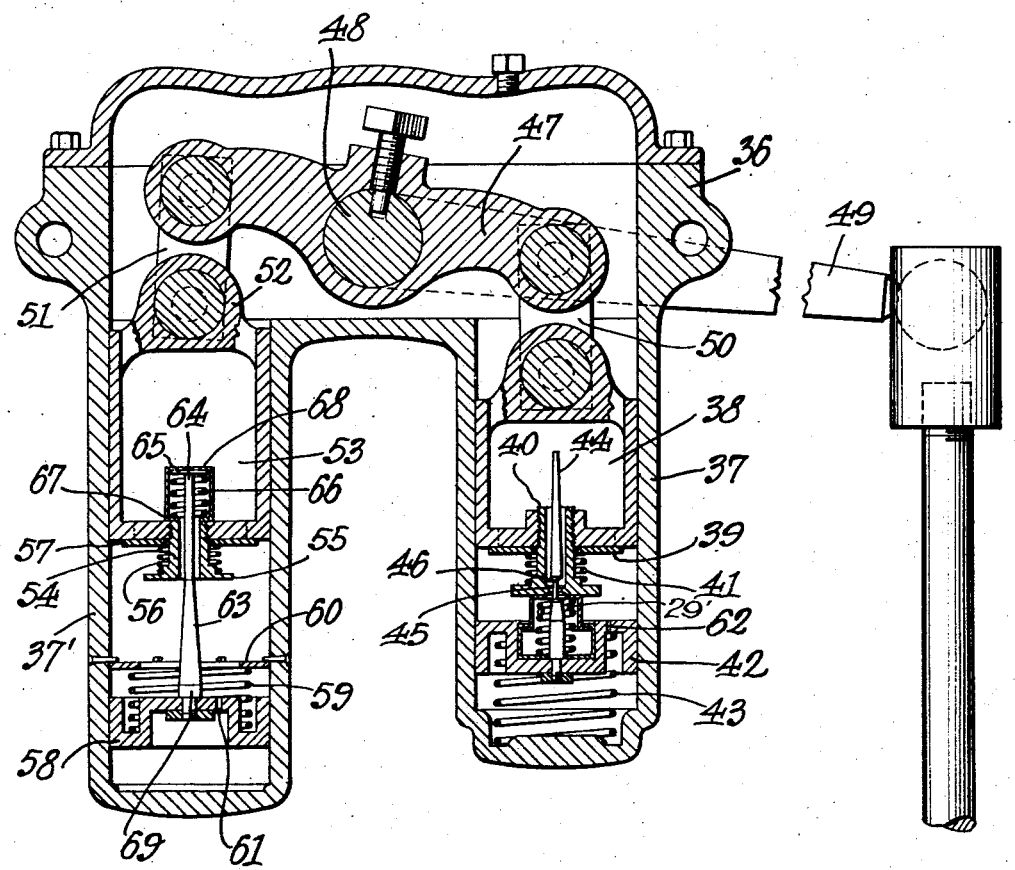

Patented May 9, 1933

1,908,391

UNITED STATES PATENT OFFICE

JOHN BARTRAM WHITTED, OF HAGERSTOWN, MARYLAND, ASSIGNOR TO STEWART-WARNER CORPORATION, OF CHICAGO, ILLINOIS, A CORPORATION OF VIRGINIA

SHOCK ABSORBER

Application filed April 3, 1928. Serial No. 267,038.

This invention relates to shock absorbers designed primarily for use in connection with motor vehicles, the principal object being to provide a shock absorber having a variable by-pass which will adjust itself automatically to the load and operate with equal efficiency under all load conditions.

It is also an object of the invention to provide a shock absorber which will compensate for the gradual sag of the vehicle springs as a result of wear or long continued use.

Another object of the invention is to provide a shock absorber which will allow considerable variance of installation from the proper position, such as will occur when inexperienced persons make the installation, without affecting its operation.

A further object is to provide a shock absorber having a center or zero point from which the device will work, this center or zero point being at all times in proper relation to the normal position of the vehicle springs regardless of the weight carried by them or of any sag that might develop in the springs due to weakness.

It will be obvious, that, unless a shock absorber having a variable by-pass is provided with some means for automatically adjusting itself to the load without varying the relationship of the working parts and, consequently varying the action of the shock absorber, the action of the device under different loads will not be the same. It is an object of the present invention to control the compression and recoil in a positive manner and, at the same time, allow great freedom of movement and non-preloading at certain points at and away from the center or zero point while at other points the travel of the vehicle springs is restricted to a desired degree.

A further object is to provide a shock absorber utilizing a port or by-pass with which cooperates a metering pin or valve of novel construction for controlling the flow of fluid used in the shock absorber, thereby varying the flow and, correspondingly, the movement of the working parts of the device.

With the foregoing and other objects in view which will appear as the description proceeds the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred forms of the invention have been shown.

In said drawings,

Figure 1 is a section through a shock absorber having the present improvements embodied therein.

Figure 2 is a plan view of the upper end of the piston.

Figure 3 is a bottom plan view of the piston.

Figure 4 is a section on line 4—4, Figure 2.

Figure 5 is a view similar to Figure 1 showing a modified form of the device wherein two working units are combined for the purpose of exerting proper control over a vehicle spring both during the compression and the rebound thereof.

Figure 6 is a view in diagram showing the action of the pin valve.

Referring to the figures by characters of reference 1 designates the body of the shock absorber casing, the same being formed with a recess 2 with which communicates the open end of a cylinder 3 extending from the body, the free end of this cylinder being closed as shown. A cap 4 is adapted to be secured on the body 1 for the purpose of closing or sealing the space therein, this cap being provided, if desired, with a filling opening 5 normally closed by a screw plug 6 or the like.

A transverse shaft 7 is journalled in the body 1 and any suitable means, such as an arm 8 and a coupling rod 9 can be utilized for connecting this shaft to the axle of a vehicle or any other suitable parts. The body 1 is adapted to be fastened to the chassis of the vehicle. Obviously, however, the locations of these parts can be varied from those stated, it merely being essential that, whenever a spring of a vehicle is placed under compression and subsequently rebounds, such movement shall produce a rotation of the shaft 7 relative to the body 1.

Secured to the shaft 7 so as to move therewith is a crank arm 10 located within the recess 2 and connected by a link 11 or any other suitable means to an ear 12 which extends across one end of a hollow piston 13. This piston has a working fit in the cylinder 3 and that end of the piston remote from the ear 12 is provided with segmental openings 14 separated by a spider 15 which, as shown in Figures 1 and 4, is provided preferably with a central boss 16 interiorly screw-threaded.

Seated within the boss 16 is the threaded end of a tubular stem 17 which extends beyond the apertured end of the piston and is provided at its projecting end with an annular flange or collar 18. A disk valve 19 is slidable freely on the stem 17 and is held normally seated against the adjacent face of the piston 13 by a spring 20 which bears at one end against the collar 18 and at its other end against the valve 19.

The port or by-pass through the stem 17 is restricted where it is surrounded by the collar 18, this restricted portion providing opposed tapered faces as shown at 21.

Movably mounted within the cylinder 3 between piston 13 and the closed end of the cylinder is a load compensating piston 22 in one face of which is formed a concentric recess 23 providing a seat for one end of a spring 24. The other end of this spring bears against the closed end of the cylinder. A central concentric recess 25 is provided in that face of piston 22 nearest the piston 13 and in this recess is seated a shell 26 which constitutes a lining for the recess. This shell has an inturned flange 27 at its open end which laps and serves to limit the movement of an annular flange 28 formed at one end of a cap 29 having vent openings 29'. The cap and shell obviously loosely engage each other. A coiled spring 30 is seated in the shell 26 and the cap 29 and thrusts against one end of the cap so as to hold it normally pressed against the flange or collar 18. This cap has an opening 31 which communicates with the restricted opening in the stem 17.

An elongated valve or metering pin 32 is secured at one end to the center of the compensating piston 22 and extends through spring 30 and longitudinally through the stem 17. This pin is gradually tapered from its free end and merges into a short cylindrical portion 33 at that end thereof attached to the piston 22. That portion of the pin extending through the restriction 21 is reduced annularly as shown at 34, it being understood, however, that the diameter of the pin 32 adjacent the opposite ends of the reduced portion 34 is less than the diameter of the restricted opening in the stem.

A vent 35 is provided in the load compensating piston 22 and provides a means whereby oil or other suitable fluids with which the cylinder 3 and recess 2 are filled, can flow slowly through the piston. Spring 24 is adapted to yield under different loads. Spring 30 is stronger than spring 24 so that a thrust ordinarily transmitted therethrough to the piston 22 will produce a compression of the spring 24. This spring 30, however, is adapted to yield slightly to permit movement past the zero point after the application of a load.

In practice the cylinder and the body are filled with a suitable fluid, such as oil, and after the body 1 has been attached to the chassis and the arm 8 has been anchored to the axle of the vehicle, the device is ready for use. Under normal conditions the reduced portion 34 of the pin 32 is located within the restriction in the end of stem 17. When a load of any weight is applied to the vehicle so as to cause the chassis to move downwardly relative to the axle, a rotation of shaft 7 will be produced.

When the shaft 7 has thus been rotated as described the arm 10 will be swung upwardly and the piston 13 will be pulled thereby. The fluid above the piston will press against and open the valve 19. At the same time the spring 24 will shift the equalizing piston 22 upwardly and cause it to thrust through the spring 30 against the stem 17, thereby maintaining the pin 32 in neutral or zero position relative to the piston. When a load is removed from the vehicle the upward movement of the chassis relative to the axle will result in a downward movement of the piston 13 within the cylinder 3 which closes valve 19 and causes the liquid in the path of piston 13 to flow through stem 17. The piston 13 thrusts through stem 17 against spring 30 which, in turn, thrusts against the compensating piston 22 and forces it downwardly against the spring 24 to slightly compress it. During this downward movement of the piston 22 the displaced fluid will flow slowly through the vent 35 or other by-pass into the space between the pistons. From the foregoing it will be apparent that under all load conditions the pin 32 bears the same initial relationship to the stem 17 as shown in Figure 1, that is to say, with the reduced portion 34 located in the restriction where any slight up and down movement of the piston 13 relative to cylinder 3 due to the usual resilient action of the vehicle springs will allow fluids to flow freely around the reduced portion 34 of the pin 32 and through the restriction in the stem 17. However, when the vehicle is subjected to a severe jolt sufficient to shift the axle and chassis away from their normal relative positions, a relative movement of the piston 13 and the pin 32 will be set up sufficient to effect a shock absorbing action. For example, when there is extreme movement of the axle and chassis toward each other the pressure of fluid within piston 13 will be sufficient to unseat the valve 19 and the tubular stem 17 will move upwardly along the pin 32 to bring the restriction 21 to a point beyond the reduced portion 34. This relative movement of the parts will be free and unrestrained but, on the rebound which causes the piston 13 to move toward the piston 22, valve 19 will close automatically and the only way in which the trapped fluid can be displaced will be longitudinally through the tubular stem 17. At the start of the movement of piston 13 toward piston 22 during the rebound the displaced fluid in the path of piston 13 can flow freely around the small portion of the pin 32 where surrounded by the restriction 21 as shown at $a$ in Figure 6. As the piston 13 continues to move toward piston 22, however, the pin 32 will gradually reduce the size of the space between the restriction $a$ and the pin as shown, for example, at $b$ in Figure 6. Thus the displacement of fluids through the stem 17 will be retarded gradually and the shock will be absorbed with the result that the piston and the pin will be ultimately brought to normal position where the restriction is around the reduced portion 34 as indicated at $c$ in Figure 6 at which time a limited up and down movement of the piston without retarding action will be permitted. Should the shock be so severe as to cause the restricted portion 21 to pass the reduced portion 34 of the pin, the spring 30 would yield under the power applied so as to permit a movement past the zero or center point. The portion 33 of the pin approaches the restriction 21 and nearly closes it so as to positively close the opening in the stem and stop the downward movement of the piston. Thereafter the vehicle springs return the parts to their natural positions.

Obviously the operation of this apparatus will be the same under any load conditions, the disk valve 19 allowing the fluids to flow in one direction freely through the piston while the pin valve 32 effects the gradual retard of flow on the reverse stroke from the zero or central position of the part which is maintained irrespective of the load applied to the spring 24 and the parts controlled thereby.

It is to be noted that as piston 13 has much larger openings than compensating piston 22 through which liquid may flow, and is normally forced in either direction under much greater pressure than that which is exerted on compensating piston 22, it will move much faster. For example, a shock causes piston 13 to move away from piston 22 which is forced very slowly by spring 24 as the vent 35 through which liquid may flow is very small. Therefore piston 13 returns to normal position before piston 22 has moved sufficiently to materially affect the zero point and the pressure of spring 30 then returns it to the original position. As heretofore stated the cylinder and the body of this structure are filled with oil or other suitable fluid. Obviously, therefore, when the cap 4 is secured to the top of the body an air chamber will be formed in this cap above the level of the oil. This chamber in no way affects the operation of the shock absorber. It will be apparent, however, that piston 22 will be held against the pressure of spring 24 by suction at those times when piston 13 is away from the spring 30 and exerting no pressure thereon. Thus any air that may be trapped below piston 22 during the assembly process, will escape through the vent 35 and thereafter said piston will be sealed tightly against the body of oil thereneath. Spring 24 at no time is sufficiently strong to break this seal or, in other words, create a vacuum.

As the space between the pin and the stem is larger above the restriction, the velocity of the escaping fluid is reduced and said oil is directed against the underside of the ear 12 which acts as a deflector. This operation serves to muffle the noise and to reduce agitation of the oil.

Although a single shock absorbing unit such as described can be used efficiently, it might be desirable under some conditions to provide two cooperating units as shown for example in Figure 5. In this modified structure the body 36 has two cylinders 37 and 37' extending therefrom and opening thereinto. The cylinder 37 corresponds with the cylinder 3 already described and the mechanism therein is the same as that already described with reference to Figure 1. This mechanism includes the piston 38 with its disk valve 39, tubular stem 40, valve supporting spring 41, compensating piston 42 and load compensating spring 43. The pin valve 44 is also similar to the one already described and operates in the same manner within the restriction 45 which normally extends around the reduced portion 46 of the pin valve. A crosshead 47 is connected at its center to the shaft 48 from which arm 49 extends and one end of the crosshead is connected by a link 50 to the piston 38. The other end of the crosshead is connected by a link 51 to the ear 52 at the open end of another piston 53. This last piston has a working fit in the cylinder 37' and is provided with a tubular stem 54 the free end of which has an annular flange or collar 55. A spring 56 is supported by this flange and bears against a disk valve 57 for the purpose of normally closing the adjacent end of the piston 53. A load compensating piston 58 is mounted in the cylinder and thrusts through a spring 59 against a ring 60 held in any suitable manner within the cylinder. This piston has a vent 61 similar to the vent 62 in the piston 42 and a pin valve 63 extends from piston 58 and through the stem 54. That portion of the pin valve normally in the stem 54 is cylindrical as shown at 64 and has a head or enlargement at its free end as shown at 65 for engagement with one end of a coiled spring 66. The other end of this spring bears upon an inturned flange 67 carried by a cap 68 mounted in the piston 53 and normally bearing against one end thereof. That portion of the pin valve 63 between the two pistons is tapered toward the piston 58 except adjacent its point of attachment where it has a short cylindrical portion 69 the diameter of which is slightly less than the diameter of the passage within the stem 54. Obviously the parts within the cylinder 37' act oppositely to the parts within the cylinder 37. Variations in the load will cause adjustment of the pistons through the action of the spring 66 through the pin valve 63 and the piston 58 so as to maintain the two pistons at zero positions relative to each other. When, however, the chassis and axle are shifting relative to each other and the piston 38 is moving toward the piston 42 for absorbing shock, the piston 53 will be moved away from piston 58 so as to cause valve disk 57 to open. On the reverse movement of the parts, however, valve 57 will close while valve disk 59 is opening and the relative movement of the parts will be retarded by the entry of the tapered portion of the pin valve 63 into the stem 54.

The mechanism in the cylinder 37' operates to prevent the vehicle spring from being compressed beyond a predetermined position irrespective of the force of the shock to which the vehicle is subjected.

Obviously other modifications of this device may be devised, at the same time retaining the means for adjusting the shock absorber to the load so that the parts will always start from a zero position irrespective of the load, and also retaining the pin valve with its taper for producing a variable reduction of speed of movement in one direction.

Although a regularly tapered valve pin has been disclosed it is to be understood that various other shapes can be employed and means other than pins might be used for the purpose of getting a variable retardation for absorbing shocks.

The terms "piston" and "cylinder" herein used are to be understood as referring to any mechanical equivalents of the parts referred to.

What is claimed is:

1. A shock absorber for vehicles including a cylinder for holding fluid, a yieldingly restrained load compensating piston therein, a pressure piston in the cylinder for actuation relative to the cylinder and load compensating piston by the relative movement of the chassis and axle of a vehicle, cooperating means on the pistons for variably retarding the flow of fluid past the pressure piston, during relative movement of the pistons away from normal or "zero" positions, and a compression spring between the pistons and connected to one piston, means forcing the load compensating piston in contact with said spring, for maintaining the pistons normally in a predetermined or "zero" relation under any vehicle load.

2. A shock absorber for vehicles including a cylinder for holding fluid, a yieldingly restrained load compensating piston therein, a pressure piston in the cylinder for actuation relative to the cylinder and load compensating piston by the relative movement of the chassis and axle of a vehicle, cooperating means on the pistons for variably retarding the flow of fluid in one direction past the pressure piston, during relative movement of the pistons away from normal or "zero" positions, means for maintaining the pistons normally in a predetermined or "zero" relation under any vehicle load, and means for allowing free movement of one of the pistons relative to each other within predetermined limits while said pistons are at their "zero" or normal positions.

3. A shock absorber for vehicles including a cylinder for holding fluid, a yieldingly restrained load compensating piston therein, a pressure piston in the cylinder for actuation relative to the cylinder and load compensating piston by the relative movement of the chassis and axle of a vehicle, a compression spring urging the compensating piston toward the pressure piston, and stronger spring means urging the pistons a predetermined distance apart, cooperating means on the pistons for variably retarding the flow of fluid in one direction past the pressure piston, during relative movement of the pistons away from normal or "zero" positions, said cooperating means including a tapered pin carried by the load compensating piston, there being an opening in the other piston through which the pin extends.

4. A shock absorber for vehicles including a cylinder for holding fluid, a load compensating piston therein, a pressure piston in the cylinder for actuation relative to the cylinder and load compensating piston by the relative movement of the chassis and axle of a vehicle, cooperating means on the pistons for variably retarding the flow of fluid in one direction past the pressure piston, during relative movement of the pistons away from normal or "zero" positions, said cooperating means including a tapered pin carried by the load compensating piston, there being an opening in the other piston through which the pin extends, a compression spring carried by one of the pistons for transmitting a thrust from the pressure piston to the load compensating piston, and a spring between the cylinder end and the load compensating piston for urging the load compensating piston toward the pressure piston.

5. A shock absorber including a cylinder, a pressure piston mounted to slide therein, means operated by the relative movement of the chassis and axle of a vehicle for shifting the piston relative to the cylinder, a yieldingly restrained load compensating piston within the cylinder having a vent, means carried by the pressure piston for permitting free passage of fluid therethrough during the movement of the piston away from the load compensating piston and for cutting off the free flow of fluid during the movement of said piston in the opposite direction, a compression spring carried by one of the pistons for exerting a thrust from one of the pistons to the other, a spring between the cylinder end and load compensating piston for urging the load compensating piston toward the pressure piston, and means for variably retarding the movement of the pressure piston toward the load compensating piston.

6. A shock absorber including a cylinder, a pressure piston mounted to slide therein, means operated by the relative movement of the chassis and axle of a vehicle for shifting the piston relative to the cylinder, a load compensating piston within the cylinder having a vent and urged toward the pressure piston by a compression spring, means carried by the pressure piston for permitting free passage of fluid therethrough during the movement of the piston away from the load compensating piston and for cutting off the free flow of fluid during the movement of said piston in the opposite direction, yielding means for exerting a thrust from one of the pistons to the other, and means for variably retarding the movement of the pressure piston toward the load compensating piston, said means including an elongated tapered pin carried by the load compensating piston, there being an opening in the pressure piston through which the pin extends.

7. A shock absorber including a cylinder, a pressure piston mounted for reciprocation therein, means operated by the relative movement of the chassis and axle of a vehicle for setting up a relative movement of said piston and cylinder, a spring pressed load compensating piston within the cylinder urged toward said pressure cylinder by a compression spring, a tapered pin extending therefrom, there being an opening in the pressure piston through which the pin extends, and yielding means for transmitting a thrust from one piston to the other and for maintaining said pistons normally in a predetermined relation irrespective of the load to which the vehicle is subjected.

8. A shock absorber including a cylinder, a pressure piston mounted for reciprocation therein, means operated by the relative movement of the chassis and axle of a vehicle for setting up a relative movement of said piston and cylinder, a spring pressed load compensating piston within the cylinder urged toward said pressure cylinder by a compressing spring, a tapered pin extending therefrom, there being an opening in the pressure piston through which the pin extends, yielding means for transmitting a thrust from one piston to the other and for maintaining said pistons normally in a predetermined relation irrespective of the load to which the vehicle is subjected, and a check valve carried by the pressure piston adapted to close during the movement of the pistons toward each other, thereby to displace fluid along the pin through the opening, there being a vent in the load compensating piston.

9. A shock absorber including separate communicating cylinders constituting a fluid container, a pressure piston mounted within each cylinder, means operated by the relative movement of the chassis and axle of a vehicle for simultaneously actuating the pressure pistons in opposite directions respectively, a resiliently held load compensating piston within each cylinder, means for maintaining each pressure piston normally in a predetermined relation to the adjacent load compensating piston, cooperating means upon the pistons in one of the cylinders for effecting a variable flow of fluid through one of the pistons during the movement of said pistons toward each other, thereby to variably retard the movement of a vehicle chassis and axle toward each other away from normal or "zero" position, and cooperating means upon the pistons in the other cylinder for variably retarding the movement of said pistons toward each other during the movement of a vehicle chassis and axle away from each other.

10. A shock absorber including a container for holding fluid, relatively movable elements therein for effecting the flow of fluid in the container, means for yieldingly holding said elements in a predetermined or "zero" relation under any vehicle load comprising spring means holding the elements apart and other spring means of lesser power urging the elements together, and separate means carried by said elements for variably retarding the flow of fluid to variably retard the relative movement of the elements from normal or "zero" positions.

11. A shock absorber containing a fluid and including a pressure piston and a compensating piston, means carried by the compensating piston for controlling the flow of fluid past the pressure piston, separate springs for moving the compensating piston in opposite directions respectively, and means for holding one of the springs within a predetermined length, 12. A shock absorber containing a liquid, including means for setting up a flow of liquid, and a metering pin for controlling the flow of liquid, said pin having a reduced portion positioned between larger portons, the said larger portions being tapered, one of the larger portions decreasing in size away from the reduced portion and the other of the larger portions increasing in size away from the reduced portion.

13. A shock absorber containing a liquid, including means for setting up a flow of liquid, a metering pin for controlling the flow of liquid, means for automatically moving the pin to conform with the relative normal positions of the body and axle of a vehicle to which the shock absorber is attached, and means for holding the metering pin substantially at said position during relative movement of the body and axle while the vehicle is being driven.

14. A device for controlling the approaching and separating movements of two relatively movable members comprising, in combination, a casing secured to one of said members and providing a fluid reservoir and two cylinders, a piston in each cylinder, connected to the other relatively movable member, each piston having a passage providing for the transfer of fluid from one side thereof to the other, one piston controlling the approaching movement of said members, the other the separating movement thereof, metering means in each cylinder for restricting the flow of fluid through its respective piston as it moves in one direction, and means in the one cylinder for adjusting the metering means therein into normal position substantially relative to the piston, as said piston is moved by variations in the static load upon one of said relatively movable members.

15. A device for controlling the approaching and separating movements of two relatively movable members comprising, in combination, a casing secured to one of said members and providing a fluid reservoir and two cylinders, a piston in each cylinder, connected to the other relatively movable member, each piston having a passage providing for the transfer of fluid from one side thereof to the other, one piston controlling the approaching movement of said members, the other the separating movement thereof, metering means in each cylinder for restricting the flow of fluid through its respective piston as it moves in one direction, and means including a resilient connection between the metering means in the one cylinder and its respective piston, whereby said metering means will follow the movements of its piston and assume its normal position relative thereto substantially only when said piston is moved out of normal position by variations in the static load upon one of the relatively movable members.

In testimony that I claim the foregoing as my own, I have hereto affixed my signature.

JOHN BARTRAM WHITTED.